(12) United States Patent
Nishikawa

(10) Patent No.: US 6,966,515 B2
(45) Date of Patent: Nov. 22, 2005

(54) HANDLE ATTACHMENT STRUCTURE FOR FISHING REEL

(75) Inventor: Tomohiro Nishikawa, Osaka (JP)

(73) Assignee: Shimano Inc., Osaka (JP)

( * ) Notice: Subject to any disclaimer, the term of this patent is extended or adjusted under 35 U.S.C. 154(b) by 29 days.

(21) Appl. No.: 10/766,021

(22) Filed: Jan. 29, 2004

(65) Prior Publication Data

US 2004/0200915 A1 Oct. 14, 2004

(30) Foreign Application Priority Data

Feb. 5, 2003 (JP) .............................. 2003-028474

(51) Int. Cl.[7] .......................................... A01K 89/02
(52) U.S. Cl. ...................................... 242/282; 74/545
(58) Field of Search ............................... 242/282, 283, 242/284; 74/545

(56) References Cited

U.S. PATENT DOCUMENTS

| | | | | |
|---|---|---|---|---|
| 5,529,255 A | * | 6/1996 | Asano et al. ............. | 242/268 |
| 5,906,323 A | * | 5/1999 | Morimoto et al. ......... | 242/283 |
| 6,102,315 A | * | 8/2000 | Sato ........................... | 242/249 |
| 6,305,627 B1 | * | 10/2001 | Stiner et al. ................ | 242/283 |
| 6,666,396 B2 | * | 12/2003 | Landwerlen ................ | 242/283 |
| 6,712,301 B2 | * | 3/2004 | Morise ....................... | 242/319 |

FOREIGN PATENT DOCUMENTS

| | | | | | |
|---|---|---|---|---|---|
| EP | | 654216 A | * | 5/1995 | ................. 242/282 |
| JP | | 3043237 B2 | | 3/2000 | |

* cited by examiner

*Primary Examiner*—Emmanuel Marcelo
(74) *Attorney, Agent, or Firm*—Shinjyu Global IP Counselors, LLP

(57) ABSTRACT

A handle assembly 1 for a spinning reel includes handle shafts 1a, and a handle arm 1b that is detachably mounted to a handle shaft 1a. The handle arm 1b has a through hole 1j formed in the base end thereof. A male threaded portion 80c of the handle shaft 1a is mounted in the through hole 1j, and the handle arm 1b is detachably installed on the handle shaft 1a by a nut member 90a. A cap member 90f that covers the entire nut member 90a is mounted to the outer periphery of the nut member 90a. A male threaded portion 90e is formed on the tip of the cap member 90f, and the cap member 90f is fixed to the nut member 90a by screwing the male threaded portion 90e to a female threaded portion 90d formed on a head portion of the nut member 90a.

14 Claims, 14 Drawing Sheets

HANDLE ATTACHMENT STRUCTURE FOR FISHING REEL

BACKGROUND OF THE INVENTION

1. Field of the Invention

The present invention relates to a handle attachment structure for a fishing reel. More specifically, the present invention relates to a handle attachment structure for a fishing reel that detachably mounts a handle arm to a handle shaft of the fishing reel.

2. Background Information

Generally, the types of fishing reels include spinning reels and dual bearing reels. These types of fishing reels include a handle assembly that is rotatively mounted to a reel unit that winds fishing line. The handle assembly includes a handle shaft that is rotatively provided in the reel unit, a handle arm that extends in the radial direction from the handle shaft, and a handle knob that is mounted on the tip of the handle arm. With this type of handle assembly, the handle arm is attached to the handle shaft by non-rotatably mounting a through hole formed in the base end of the handle arm on a male threaded portion formed on the tip of the handle shaft, and fastening a nut member to the male threaded portion.

In addition, with this type of fishing reel, a cap member can be mounted on the base end of the handle arm to cover the periphery of the nut member, as shown in Japanese Patent No. 3043237, which is hereby incorporated by reference. The cap member is, for example, made of a synthetic resin, and is resiliently press-fitted into a mounting portion formed in the base end of the handle arm.

With the foregoing conventional handle attachment structure, the design thereof can be improved because the cap member is mounted on the base end of the handle arm to cover the periphery of the nut member. However, there is a need to form the mounting portion in the base end of the handle arm because the conventional handle cap is resiliently press-fitted into the handle arm. Thus, in forming the mounting portion in the base end of the handle arm, after-processing such as cutting and the like will have to be performed, which will take time and cause an increase in manufacturing costs.

In view of the above, it will be apparent to those skilled in the art from this disclosure that there exists a need for an improved a handle attachment structure for a fishing reel. This invention addresses this need in the art as well as other needs, which will become apparent to those skilled in the art from this disclosure.

SUMMARY OF THE INVENTION

An object of the present invention is to improve the design of a handle attachment structure for a fishing reel with an inexpensive structure.

A handle attachment structure for a fishing reel in accordance with a first aspect of the present invention detachably mounts a handle arm to a handle shaft of the fishing reel. The handle attachment structure includes a through hole, a first male threaded portion, a nut member, and a cap member. The through hole is formed in the base end of the handle arm and non-rotatably mounted to the tip of the handle shaft. The first male threaded portion is formed on the tip of the handle shaft and mounted in the through hole. The nut member has a first female threaded portion formed in the inner periphery thereof that engages with the first male threaded portion. Further, the nut member fixes the handle arm to the handle shaft. The cap member includes a second male threaded portion that engages with the first female threaded portion and is disposed so that it covers the circumference of the nut member.

With this handle attachment structure, the cap member is mounted by engaging the second male threaded portion with the first female threaded portion formed in the nut member. Here, by screwing and mounting the cap member into the first female threaded portion of the nut member, it is not necessary to form a mounting portion on the base end of the handle arm as with conventional handle attachment structures. Further, the design of the handle attachment structure can be improved with an inexpensive structure.

A handle attachment structure for a fishing reel in accordance with a second aspect of the present invention detachably mounts a handle arm to a handle shaft of the fishing reel. The handle attachment includes a through hole, a first male threaded portion, a nut member, and a cap member. The through hole is formed in the base end of the handle arm and non-rotatably mounted to the tip of the handle shaft. The first male threaded portion is formed on the tip of the handle shaft and mounted in the through hole. The nut member has a first female threaded portion formed in the inner periphery thereof that engages with the first male threaded portion and which fixes the handle arm to the handle shaft. The cap member includes a second female threaded portion that engages with the first male threaded portion and is disposed so that it covers the circumference of the nut member.

With this handle attachment structure, the cap member is mounted by engaging the second female threaded portion with the first male threaded portion formed on the tip of the handle shaft. Here, by screwing and mounting the cap member onto the first male threaded portion of the handle shaft, it is not necessary to form a mounting portion on the base end of the handle arm as with conventional handle attachment structures. Thus, as with the structure of the first aspect, the design of the handle attachment structure can be improved with an inexpensive structure.

A handle attachment structure for a fishing reel in accordance with a third aspect of the present invention is the handle attachment structure of first or second aspect, in which the nut member includes a plurality of engagement recess portions that are formed in a polygon-shaped outer peripheral portion of the nut member. The handle attachment structure further includes a rotation prevention member that engages one of the plurality of engagement recess portions and prevents the rotation of the nut member. Here, the nut member can be locked by engaging the rotation prevention member with the engagement recess portions of the nut member.

A handle attachment structure for a fishing reel in accordance with a fourth aspect of the present invention is the handle attachment structure of any of first to third aspects, in which the handle attachment structure for a fishing reel is a handle attachment structure for a spinning reel. Here, by applying the present invention to the structure that attaches the handle arm of a spinning reel to the handle shaft, the design of the handle attachment structure can be improved with an inexpensive structure.

A handle attachment structure for a fishing reel in accordance with a fifth aspect of the present invention is the handle attachment structure of any of the first to third aspects, in which the handle attachment structure for a fishing reel is a handle attachment structure for a dual bearing reel. Here, by applying the present invention to the structure that attaches the handle arm of a dual bearing reel to the handle shaft, the design of the handle attachment structure can be improved with an inexpensive structure.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
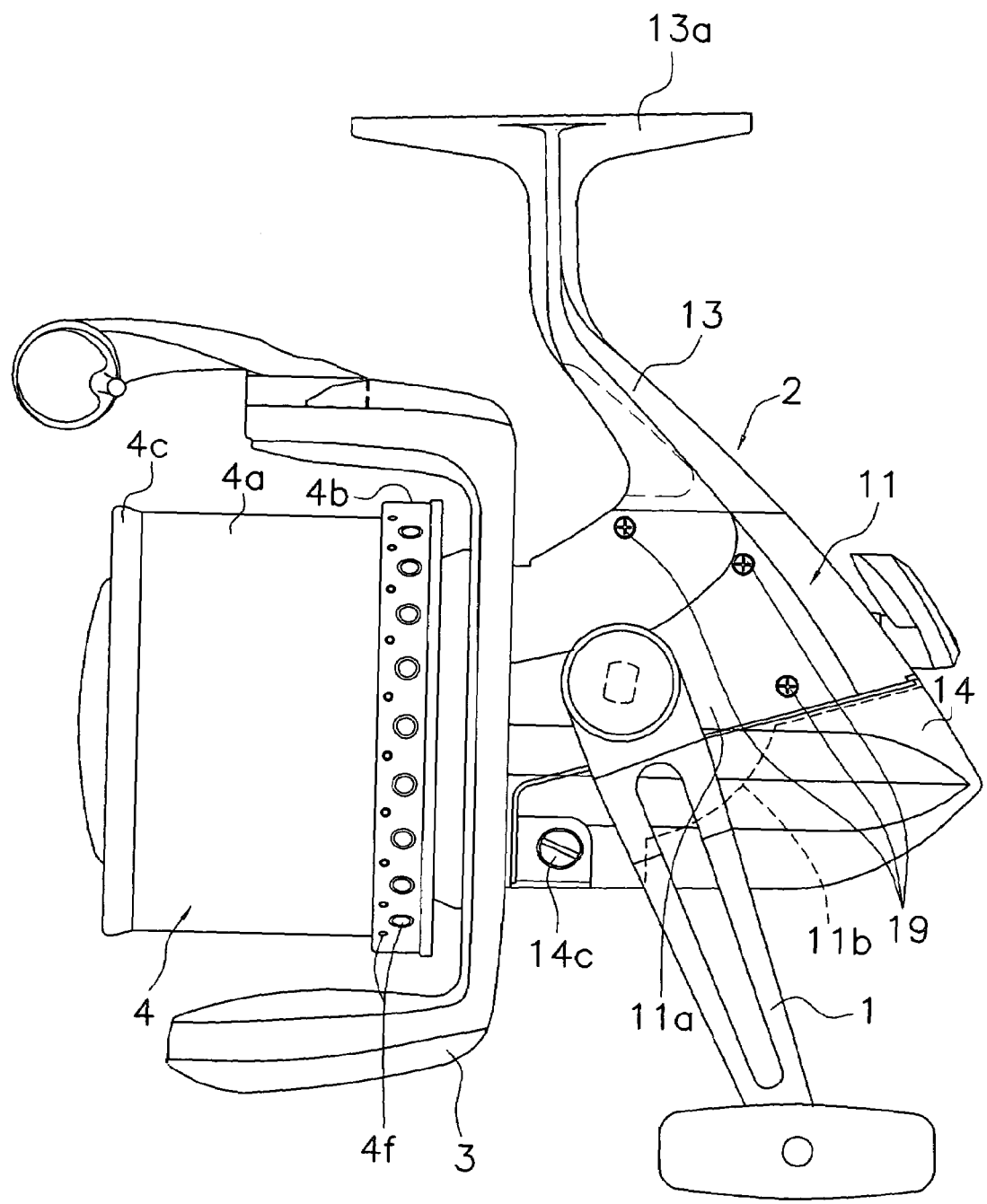
FIG. 1 is a side view of a spinning reel in accordance with a preferred embodiment of the present invention.
Figure 2:
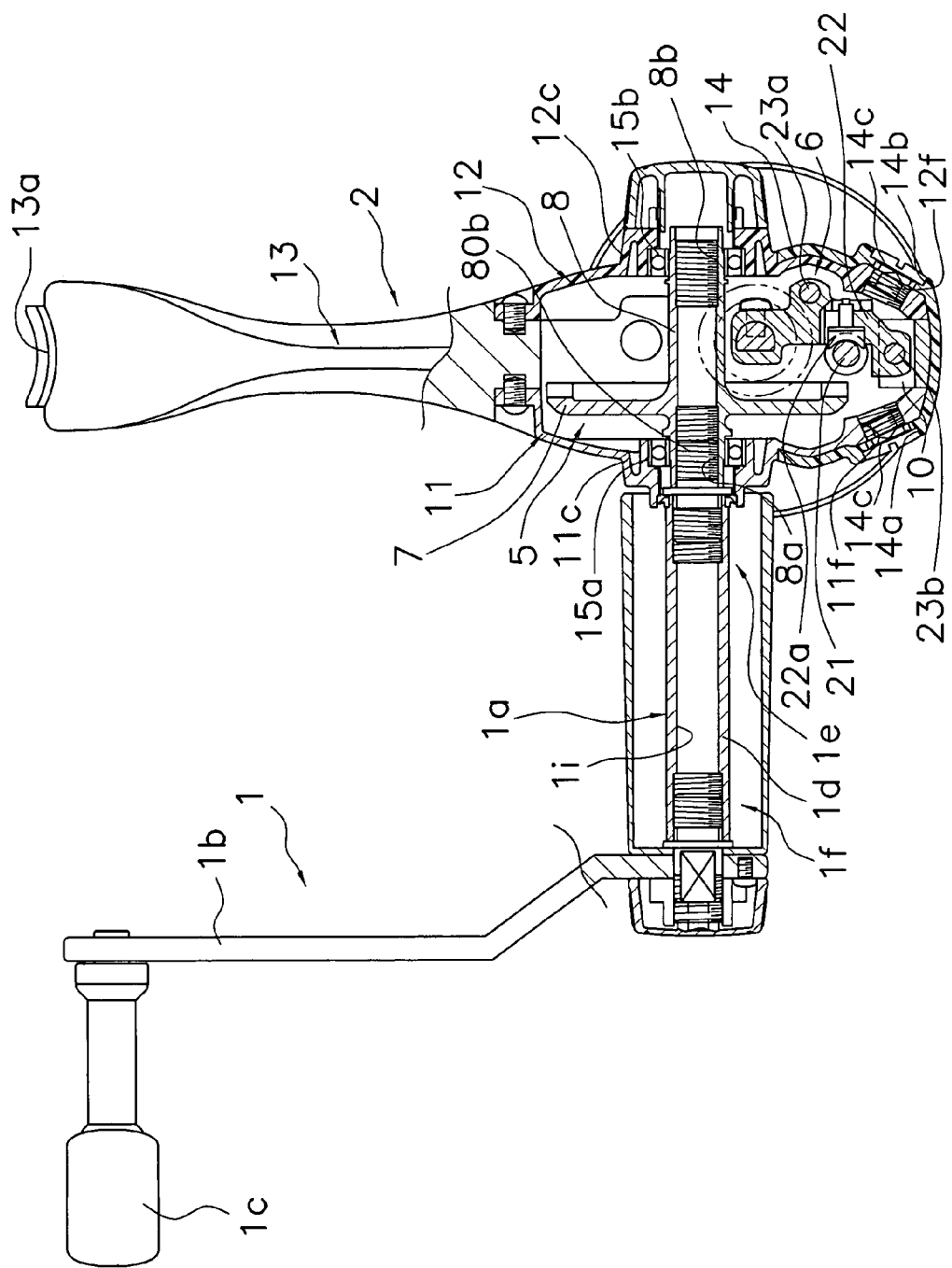
FIG. 2 is a cross-sectional rear view of the spinning reel of FIG. 1.
Figure 3:
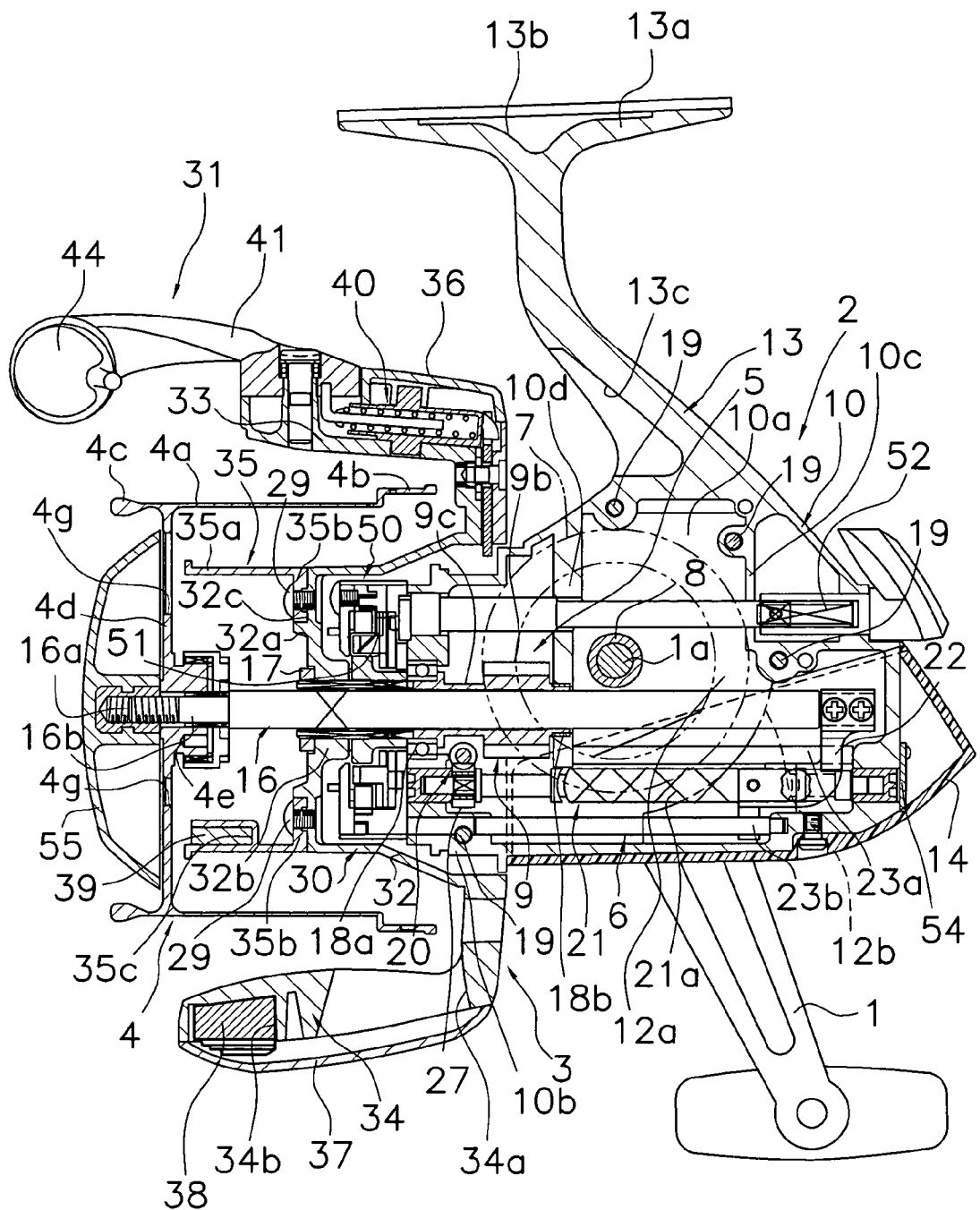
FIG. 3 is a side cross-sectional view of the spinning reel.

As shown in FIGS. 1 to 3, a spinning reel according to a first preferred embodiment of the present invention primarily includes a reel unit 2, a rotor 3, and a spool 4. The reel unit 2 has a handle assembly 1 and is mounted to a fishing rod. The rotor 3 is rotatably mounted on the front of the reel unit 2. The spool 4 is disposed on the front of the rotor 3 and moves back and forth relative to the reel unit 2. The spinning reel also includes a rotor drive mechanism 5 to drive the rotor 3 to rotate in cooperation with rotation of the handle assembly 1, and an oscillating mechanism 6 to move the spool 4 back and forth in cooperation with rotation of the rotor 3.

The reel unit 2 accommodates the rotor drive mechanism 5 and the oscillating mechanism 6 in the interior thereof. The reel unit 2 includes, as shown in FIGS. 1 to 4, a housing unit 10, first and second lids 11 and 12, a rod attachment portion 13, and a cover member 14. The housing unit 10 has an opening in both sides thereof. The first and second lids 11 and 12 close both sides of the housing unit 10. The rod-attachment portion 13 is formed integrally with the housing unit 10. The cover member 14 covers the housing unit 10 and both of the lids 11 and 12 from the rear thereof.

The surface of the housing unit 10 is preferably formed of an anodic oxide film. The housing unit 10 is made of, for example, a magnesium alloy, which is lightweight and capable of maintaining a specific strength. Further, the housing unit 10 is a frame-shaped member that forms an accommodation space 10a that accommodates and supports the rotor drive mechanism 5 and the oscillating mechanism 6. The housing unit 10 has a substantially uniform depth dimension (the dimension along the orthogonal direction to the plane of FIG. 3). A disk-shaped mechanism support portion 10b is formed in the front surface of the housing unit 10, and has a one-way clutch 51 (later-described), a pinion gear 9 (later-described), and the like for an anti-reverse mechanism 50 mounted thereto. An operation support portion 10c to support a switching operation unit 52 (later-described) of the anti-reverse mechanism 50 is formed in the rear portion. An intermediate support portion 10d provided to support the pinion gear 9 and the switching operation unit 52 extends downward from the upper portion at the rear of the mechanism supporting portion 10b.

The first lid 11 is preferably made of an aluminum alloy that can maintain a high specific strength and corrosion resistance. The first lid 11 is formed to cover one side of the housing unit 10. The first lid 11 is, as shown in FIG. 2, arranged adjacent to a master gear 7. As is clear from FIGS. 1, 2, and 4, the first lid 11 includes a first cover portion 11a and a second cut-out portion 11b. The first cover portion 11a covers the master gear 7 that rotates according to rotation of the handle assembly 1 in the opening of one side of the housing unit 10. The second cut-out portion 11b exposes an opening rearward from the first cover portion 11a (further rearward than the portion indicated by the dashed line in FIG. 1). This type of second cut-out portion 11b is formed to minimize the overlapping portion between the first lid 11 and the cover member 14 to achieve weight reduction.

Figure 4:
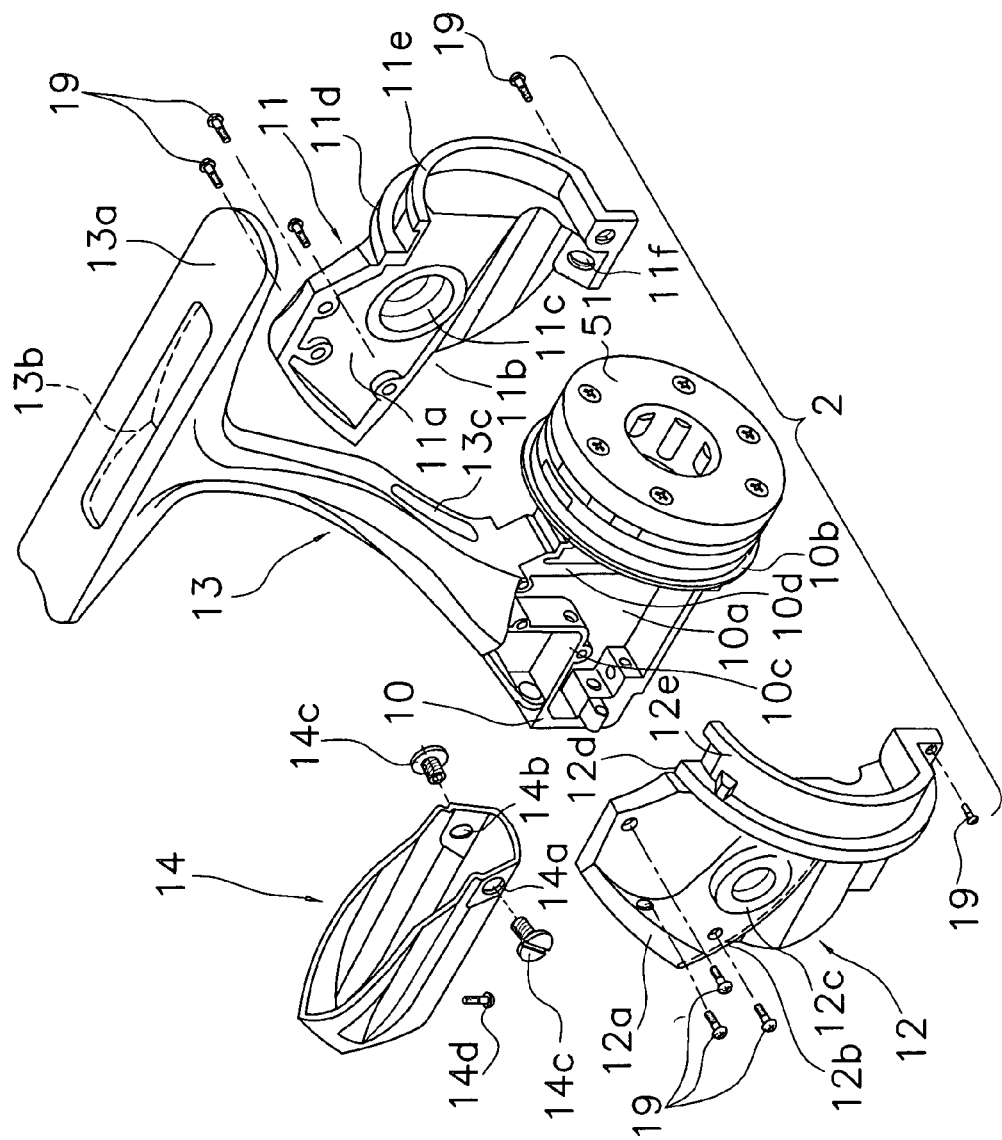
FIG. 4 is an exploded perspective view of a reel unit of the spinning reel.

As shown in FIGS. 2 and 4, a first boss portion 11c that supports one end of a master gear shaft 8 on which the master gear 7 is arranged is formed on the first lid 11. The first boss portion 11c protrudes outward on the approximate central portion of the wall surface. An approximately semi-circular first flange portion 11d that constitutes a disk-shaped portion that enters inside the rotor 3 is formed on the front portion of the first lid 11. An approximately semi-circular arc-shaped first mechanism accommodating cover 11e that is disposed on the rear surface of the mechanism support portion 10b and that is approximately flush with the outer peripheral surface of the mechanism support portion 10b is formed on the front portion of the first flange portion 11d. Since the master gear 7 is adjacently arranged to the first lid 11, a large force tends to act on the first boss portion 11c when the master gear shaft 8 receives a large load. In view of this, the first lid 11 is made of metal in order to keep the specific strength high. In a lower front portion of the first lid 11, a first screw hole 11f is formed for fitting the cover member 14 and for performing maintenance such as draining water after washing or filling with grease.

The second lid 12 has a shape that is substantially symmetrical and has a mirror image relationship with the first lid 11. Provided therewith are a second cover portion 12a, a second cut-out portion 12b, a second boss portion 12c, a second flange portion 12d having substantially a mirror image relationship with the first flange portion 11d, and a mechanism accommodating cover 12e. A second screw hole 12f (see FIG. 2) is also formed at a location opposing the first screw hole 11f. The first and second flange portions 11d and 12d are formed so as to constitute a circular shape together with the outer peripheral surface of the rear of the mechanism supporting portion 10b of the housing unit 10. This circular portion is configured to be inserted in the rear of the rotor 3 to have a slight gap. The second lid 12 is arranged relatively far from the master gear 7, so a large force is not likely to act on the second boss portion 12c. Accordingly, in order to achieve weight reduction, it is made of a synthetic resin such as nylon 66. The second boss portion 12c is formed to protrude outward on the approximate central portion opposing the first boss portion 11c of the wall surface of the second lid 12, and to support the other end of the master gear shaft 8.

The rod-attachment portion 13 is a T-shaped member extending upward from the housing unit 10, of which a reel foot 13a formed on the tip thereof and extending longitudinally is mountable onto a reel seat (not shown) of a fishing rod. The rod-attachment portion 13 is formed so that thickness-reducing portions 13b and 13c are formed in its upper face and front face to attain weight reduction and uniform wall thickness.

The cover member 14 is curved to cover the sides and the bottom of the housing unit 10 from the rear thereof onto which the first and second lids 11 and 12 are mounted. The cover member 14 is provided in order to close or connect the first and second cut-out portions 11b and 12b formed at the rear of the first and second lids 11 and 12, and to prevent the side and the rear face of the reel unit 2 including its rear end corner from being scratched. The cover member 14 is preferably made of a relatively hard synthetic resin such as ABS resin, and its surface is subjected to metal plating. In the cover member 14, stepped screw-fitting holes 14a and 14b are formed at the locations corresponding to the first and second screw holes 11f and 12f at the front side. Each of the first and second screw holes 11f and 12f has a screw member 14c screwed therethrough. The screw member 14c is also screwed through the screw-fitting holes 14a and 14b so that the cover member 14 is fastened to the first lid 11 and second lid 12, and so that the cover member 14 can be opened or removed for maintenance. The cover member 14 is screwed onto the lower surface of the housing unit 10 at the rear end of the lower surface of the cover member 14. It is also fixed by a screw member 14d.

Referring to FIGS. 2 and 3, the rotor drive mechanism 5 includes a master gear shaft 8, a master gear 7, and a pinion gear 9. A handle shaft 1a of the handle assembly 1 is screwed into a master gear shaft 8. The master gear 7 is formed integrally with the master gear shaft 8. The pinion gear 9 meshes with the master gear 7. The master gear shaft 8 is rotatively mounted to the reel unit 2 by bearings 15a and 15b respectively fitted onto the first and second boss portions 11c and 12c formed in the first lid 11 and the second lid 12 of the reel unit 2. The female threaded portions 8a and 8b are respectively formed on the inner circumferential surfaces of both ends of the master gear shaft 8. The female threaded portions 8a and 8b are screws, or more precisely, screw holes, that are tightened when the handle assembly 1 is rotated in a line reel-in direction. Therefore, the female threaded portion 8a on the left of FIG. 2 is a left screw, whereas the female threaded portion 8b on the right of FIG. 2 is a right-hand screw. It should be noted that the handle assembly 1 can be attached to either end of the master gear shaft 8, either to the left side as shown in FIGS. 1 and 3 or the right side as shown in FIG. 2. Nevertheless, since the female threaded portions 8a and 8b have different tightening directions, respective handle shafts 1a are made available for specific use in attaching the handle shaft 1a on respective sides. FIG. 2 shows the handle shaft 1a for the left handle.

Figure 10:
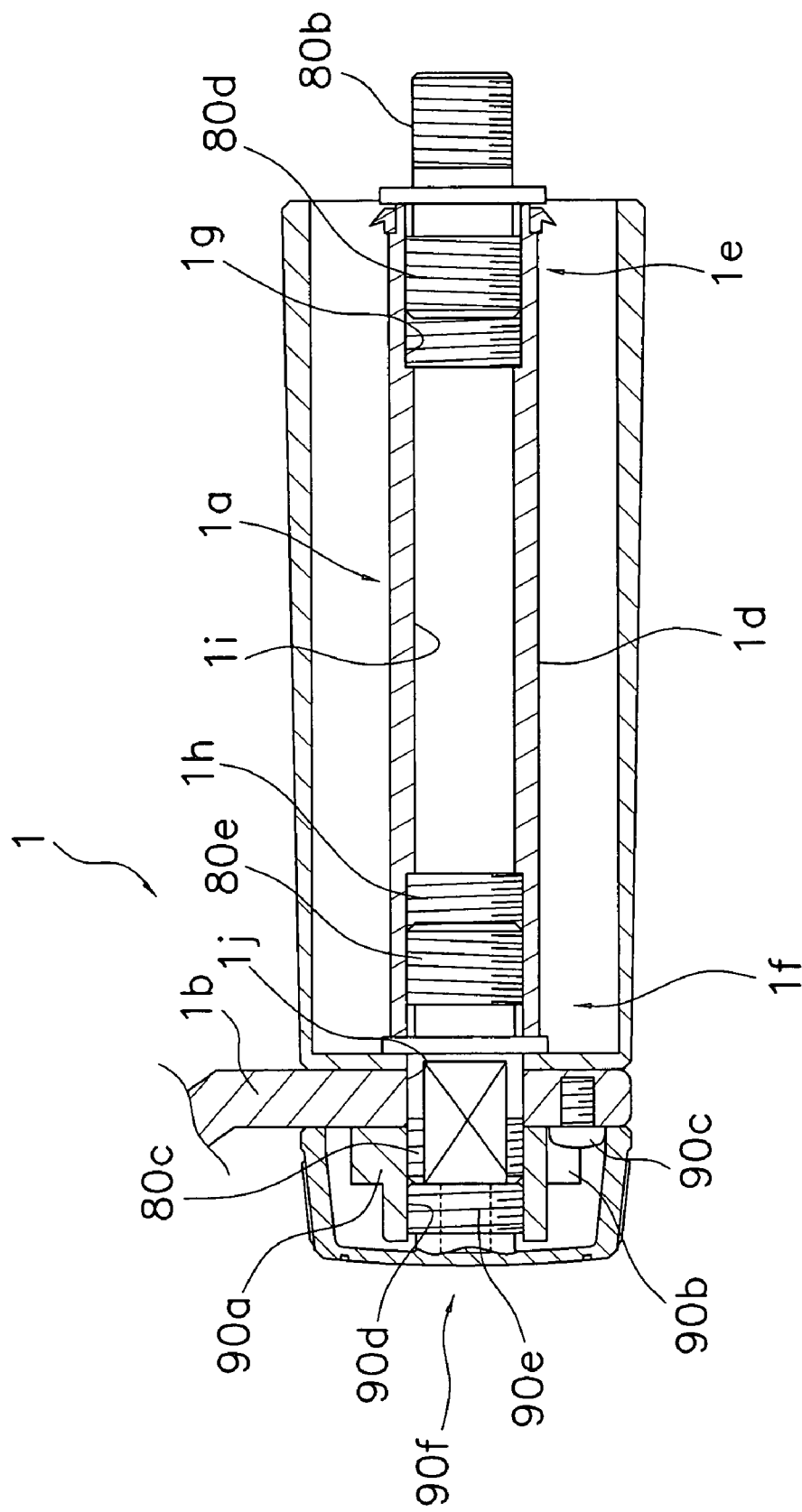
FIG. 10 is an enlarged cross-sectional view of a handle assembly of the spinning reel.

As shown in enlarged view of FIG. 10, the handle assembly 1 includes a right handle shaft not shown in the figures and a left handle shaft (hereinafter referred to as handle shaft 1a) that are concentric with the master gear shaft 8 (see FIG. 2) when mounted. The handle assembly 1 also includes a handle arm 1b detachably mounted to either handle shaft, and a handle knob 1c (see FIG. 2) that is rotatively mounted to the tip of the handle arm 1b. As shown in FIGS. 2 and 10, the handle shaft 1a is a three piece structure that includes a tubular main shaft unit 1d, a first shaft portion 1e, and a second shaft portion 1f. The first shaft portion 1e is screwed onto one end of the main shaft unit 1d and the master gear shaft 8. The second shaft portion 1f is mounted on the other end of the main shaft unit 1d and the base end of the handle arm 1b.

As shown in FIG. 10, the main shaft unit 1d is a tubular member preferably made of an aluminum alloy that is formed with a hollow space in the interior thereof. The main shaft unit 1d includes a through hole 1i that passes through the interior thereof, and a female threaded portion 1g and a female threaded portion 1h (interior female threaded portions) that are respectively formed on both ends of the through hole 1i. The first shaft portion 1e and the second shaft portion 1f are screwed into the female threaded portions 1g and 1h of the main shaft unit 1d by engaging them with male threaded portions 80d and 80e (interior male threaded portion that described below) that are respectively formed on the first shaft portion 1e and the second shaft portion 1f. Note that when the handle shaft 1a is used, the male threaded portions 80d and 80e and the female threaded portions 1g and 1h are left screws.

The first shaft portion 1e is a shaft member preferably made of a stainless steel alloy, and as shown in FIG. 10, includes a male threaded portion 80b (third male threaded portion) that is formed on the tip thereof and a male threaded portion 80d that is formed on the base end thereof. The male threaded portion 80b formed on the tip thereof is a left screw, and is screwed into the master gear shaft 10 shown in FIG. 2. The male threaded portion 80d formed on the base end thereof is a left screw, and is screwed into the female threaded portion 1g of the main shaft unit 1d.

The second shaft portion 1f is a shaft member preferably made of a stainless steel alloy, and as shown in FIG. 10, includes a male threaded portion 80e (first male threaded portion) that is formed on the tip thereof and screws into a female threaded portion 1h (first female threaded portion) of the main shaft unit 1d, and a male threaded portion 80c that is formed on the base end thereof and on which a nut member 90a is screwed.

Figure 11:
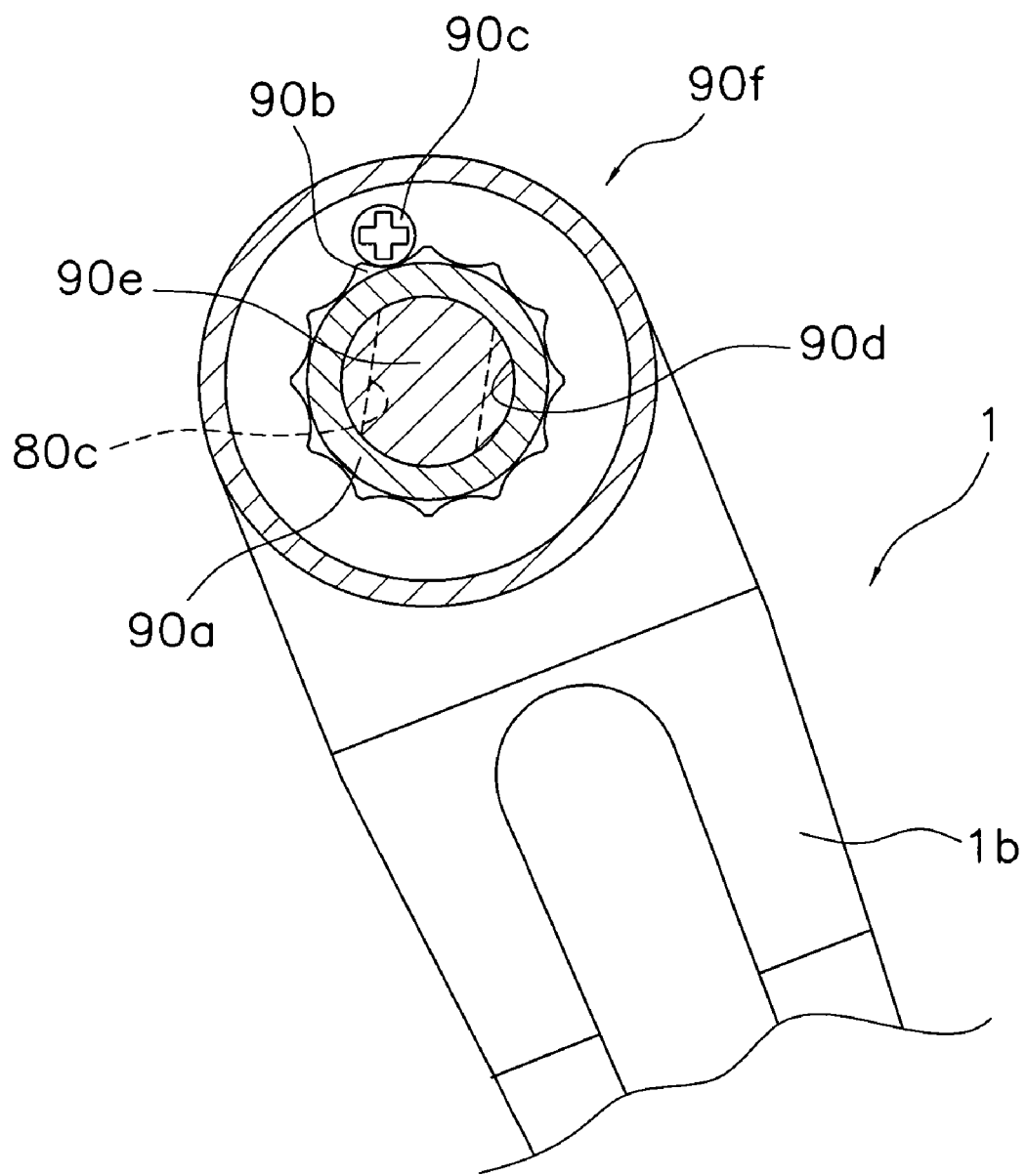
FIG. 11 is a lateral cross-sectional view of a handle attachment structure of the handle assembly.

As shown in FIG. 10, the handle arm 1b has a through hole 1j formed in the base end thereof. The male threaded portion 80c of the handle shaft 1a is mounted in the through hole 1j, and the handle arm 1b is detachably installed on the handle shaft 1a by the nut member 90a. As shown in FIGS. 10 and 11, a plurality of engagement recess portions 90b are formed in the outer periphery of the nut member 90a. Further, the nut member 90a is prevented from rotating by inserting a rotation prevention member or screw 90c into one of these engagement recess portions 90b and screwing it into the handle arm 1b. In addition, a cap member 90f that covers the entire nut member 90a is mounted on the outer periphery of the nut member 90a. A male threaded portion 90e (second male threaded portion) is formed on a tip of the cap member 90f. Further, the cap member 90f is fixed to the nut member 90a by screwing the male threaded portion 90e to a female threaded portion 90d formed on a head portion of the nut member 90a. Note that when the handle shaft 1a is used, the male threaded portion 90e and the female threaded portion 90d are right screws.

Referring to FIG. 3, the pinion gear 9 is a hollow tubular member, and its front portion passes through the rotor 3 and is mounted non-rotatably to the rotor 3. A spool shaft 16 is disposed to pass through the inner circumference of the pinion gear 9. A nut 17 is fitted to the front of the pinion gear 9, and the rotor 3 is fixed to the pinion gear 9 by the nut 17. The pinion gear 9 is supported rotatably by the respective bearings 18a and 18b at its mid-portion and rear end portion with respect to the shaft axis in the housing unit 10 of the reel unit 2. The bearing 18a is fitted in the mechanism support portion 10b, and the bearing 18b is fitted in the intermediate support portion 10d. A ring-shaped cut-out portion 9c is formed in the gear portion 9b formed on the rear end side of the pinion gear 9. The ring-shaped cut-out portion 9c is provided in order to house compactly a later-described gear-down train 20.

The oscillating mechanism 6 includes, as shown in FIGS. 2 and 3, a gear-down train 20, a worm shaft 21, a slider 22, and two guide shafts 23a and 23b. The gear-down train 20 meshes with the pinion gear 9. The worm shaft 21 rotates in cooperation with the gear-down train 20. The slider 22 engages with the worm shaft 21 and moves back and forth. The two guide shafts 23a and 23b guide the slider 22 in the spool shaft 16 direction.

Figure 5:
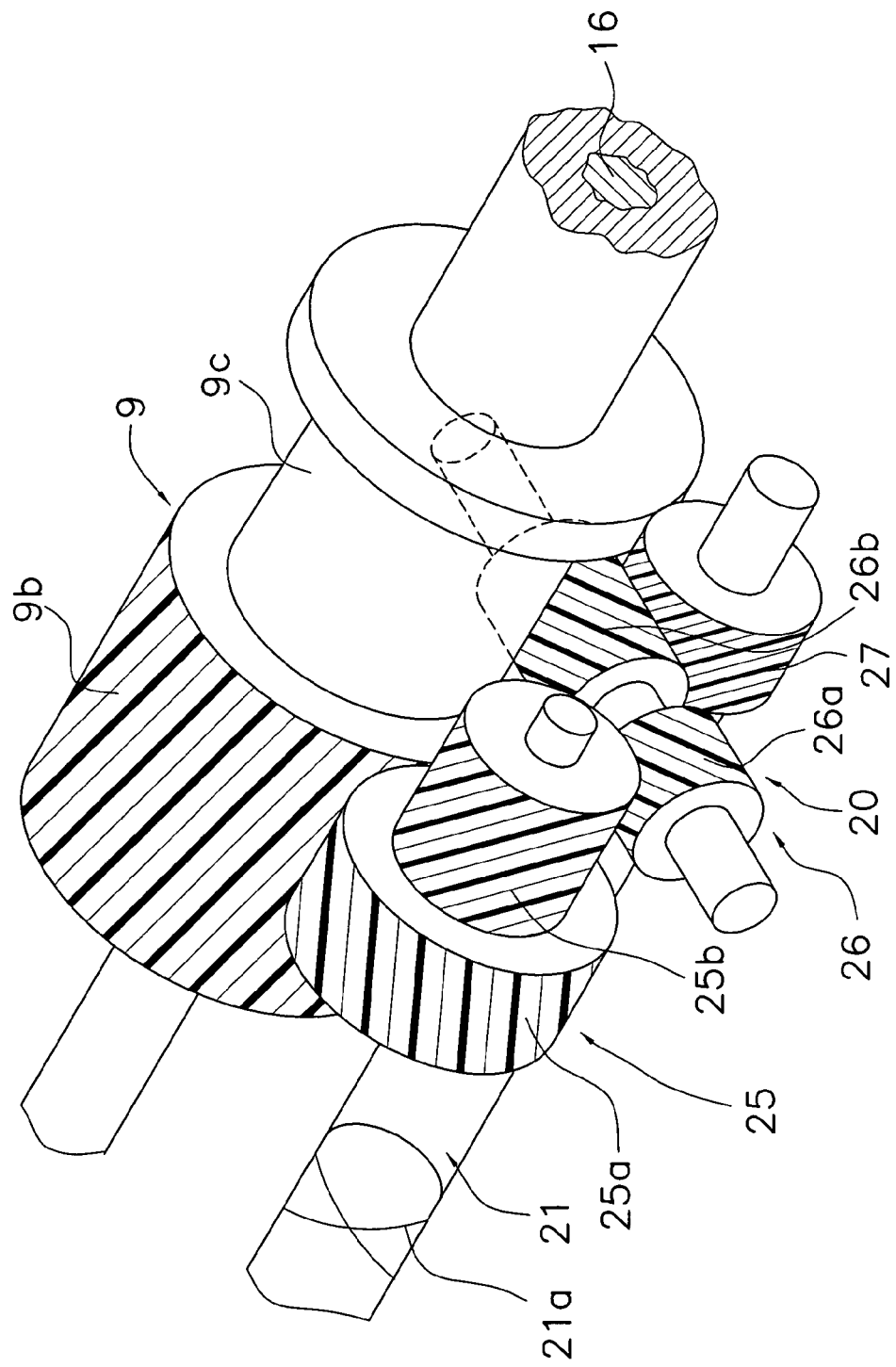
FIG. 5 is a perspective view of a gear-down train of the spinning reel.

As shown in FIGS. 3 and 5, the gear-down train 20 includes a stepped gear unit 25, an intermediate gear shaft 26, and a driven gear 27. The stepped gear unit 25 has a large diameter gear 25a and a small diameter gear 25b that mesh with the pinion gear 9. The intermediate gear shaft 26 includes a first intermediate gear 26a that meshes with the small diameter gear 25b and a second intermediate gear 26b spaced apart from the first intermediate gear 26a. The driven gear 27 meshes with the second intermediate gear 26b and is fitted non-rotatably to the worm shaft 21.

The stepped gear unit 25 rotates around an axis parallel to the pinion gear 9 rotational axis. The large diameter gear 25a is a screw gear that meshes with the pinion gear 9. The small diameter gear 25b, the first intermediate gear 26a, the second intermediate gear 26b, and the driven gear 27 are also screw gears. The intermediate shaft 26 rotates around an axis different from that of the stepped gear unit 25. Further, the worm shaft 21, to which the driven gear 27 is fitted, rotates around an axis different from that of the intermediate shaft 26 and parallel to the pinion gear 9 rotational axis. The second intermediate gear 26b of the intermediate shaft 26 is disposed below the cut-out portion 9c of the pinion gear 9. As a consequence, the worm shaft 21 can be arranged closer to the pinion gear 9 than when the cut-out portion is not formed, and thus the reel as a whole can be made compact. With the gear-down train 20 thus configured, the rotational speed of the pinion gear 9 is greatly reduced when transmitted to the worm shaft 21.

The worm shaft 21 is a member that has intersecting helical grooves 21a formed therein, and is disposed parallel to the spool shaft 16. The worm shaft 21 is rotatively mounted on the front and rear ends of the housing unit 10 via bearings made of, for example, a synthetic resin. The worm shaft 21 is inserted from the rear of the housing unit 10, and is retained by a fixing plate 54 screwed to the rear surface of the housing unit 10.

Referring now to FIGS. 2 and 3, the slider 22 has an engaging member 22a that engages with the grooves 21a of the worm shaft 21. The slider 22 is non-rotatably and immovably coupled to the rear end of the spool shaft 16. With the tip of the engaging member 22a engaging the grooves 21a, the slider 22 moves back and forth in the spool shaft direction in accordance with rotation of the worm shaft 21, and thus, moves the spool shaft 16 back and forth in cooperation with rotation of the handle assembly 1.

The guide shafts 23a and 23b pass through the slider 22, and guide the slider 22 along the spool shaft 16. The guide shaft 23a is fixed at both ends thereof by the rear end and the intermediate support portion 10d of the housing unit 10. The guide shaft 23a is mounted from the rear of the housing unit 10, and its rear end is retained by a fixing plate 54 that retains the worm shaft 21. The guide shaft 23b is fixed at both ends thereof by front and rear ends of the housing unit 10. The guide shaft 23b is inserted from the front of the housing unit 10. The front portion of the guide shaft 23b can come into contact with the fastening screw 19 that fastens the front portion of the first lid 11, and is retained by the fastening screw 19.

The rotor 3 is a so-called bail-less type of rotor in which a fishing line guide portion is provided on only one of the rotor arms. The rotor 3 includes, as shown in FIGS. 3 and 6 to 8, a rotor unit 30 rotatively mounted to the reel unit 2 via the pinion gear 9, and a fishing line guide portion 31 fitted pivotably onto the rotor unit 30. The rotor unit 30 is made of, for example, a magnesium alloy, the surface of which has an anodic oxide film formed thereon. The rotor unit 30 includes a cylindrical support portion 32 and first and second rotor arms 33 and 34 spaced from the support portion 32 and extending forward from respective opposing locations on the outer peripheral surface of the rear end of the support portion 32.

The support portion 32 is a substantially cylindrical member that is tapered so that its diameter decreases from the rear end toward the front and is then formed into a cylindrical shape. A front wall 32a is formed on the front portion of the support portion 32, and a boss portion 32b through which the front of the pinion gear 9 passes is formed in the central portion of the front wall 32a. The boss portion 32b is non-rotatably mounted to the front of the pinion gear 9. The nut 17 is screwed onto the front of the pinion gear 9 at the front of the front wall 32a, and the rotor 3 is fastened to the pinion gear 9 by the nut 17. A tubular-shaped line-entanglement prevention member 35 that prevents entanglement of fishing line with the spool shaft 16 is mounted at the front of the support portion 32.

A fishing line guide portion 31 is mounted on the tip of the first rotor arm 33 to be pivotable between a line-winding posture and a line-releasing posture. An interlocking mechanism 40 that interlocks with the pivoting of the fishing line guide portion 31 is mounted in the first rotor arm 33. The radially outward periphery of the first rotor arm 33 is covered by a first cover member 36.

Like the first rotor arm 33, the second rotor arm 34 extends forward and its radially outward periphery is covered by a second cover member 37. The second rotor arm 34 is provided for the purpose of maintaining the rotational balance of the rotor 3. For this reason, the second rotor arm 34 is configured such that its center of gravity is tilted forward in order to bring it close to the center of gravity of the first rotor arm 33 on which the fishing line guide portion 31 is mounted. In order to shift the center of gravity forward, an opening 34a is formed in the base end side of the second rotor arm 34, and a weight-accommodating portion 34b for mounting a weight 38 is formed in the tip side thereof. The weight 38 is made of, for example, a tungsten alloy. Further, in order to tilt the center of gravity forward, the second rotor arm 34 extends forward at a length that is longer than that of the first rotor arm 33, as clearly seen from FIGS. 7 and 8.

Figure 6:
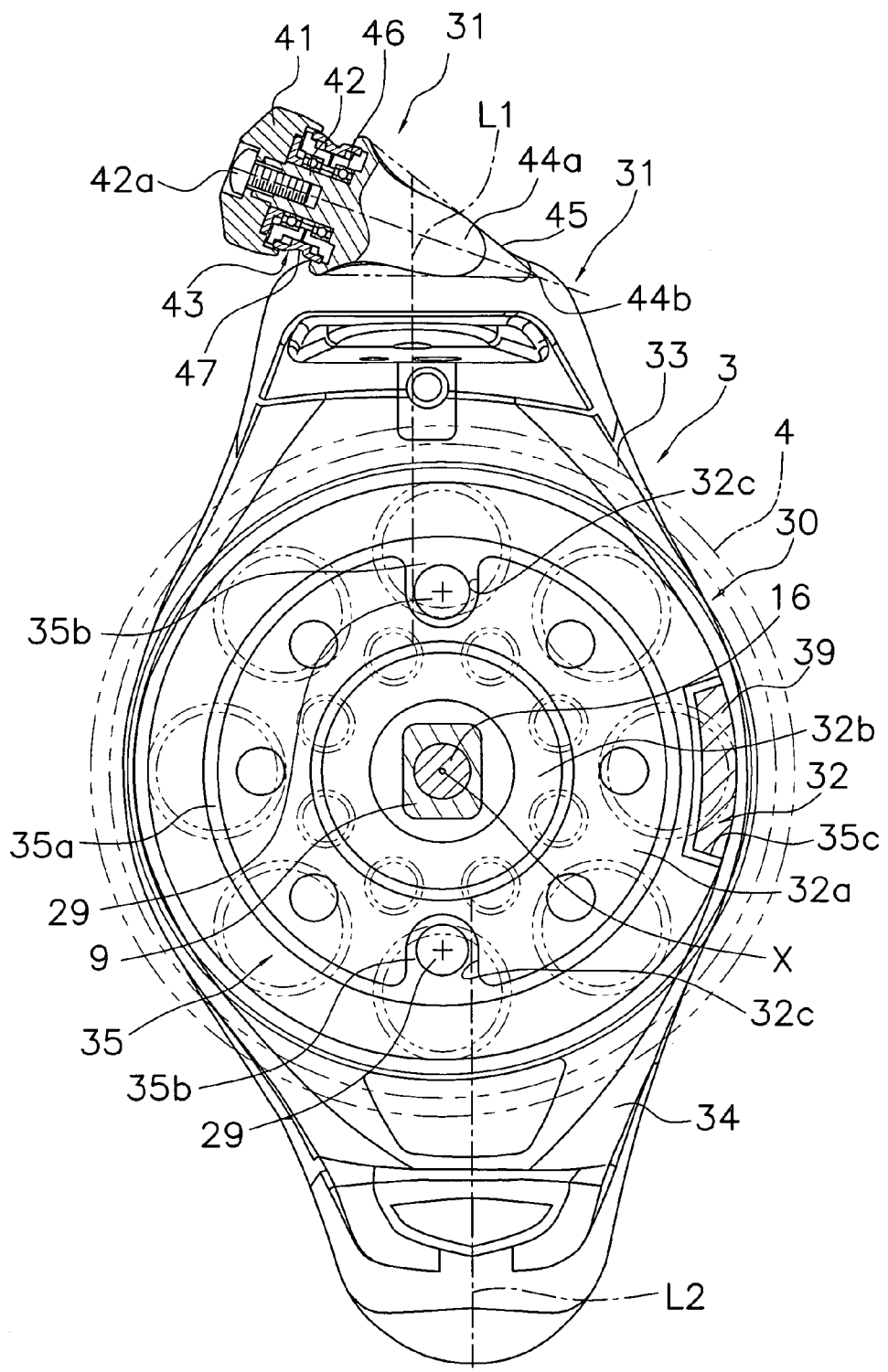
FIG. 6 is a front view of a rotor of the spinning reel with sections removed for illustrative purposes.

Here, as shown in FIG. 6, the first rotor arm 33 and the second rotor arm 34 are formed such that a first line L1 drawn through the pivot center of the fishing line guide portion 31 of the first rotor arm 1 and a second line L2 drawn through the width-wise center of the second rotor arm 34 and substantially parallel to the first line L1 are arranged so that they are spaced at the same distance from the rotational axis X of the rotor unit 30 on opposite sides thereof. When the first rotor arm 33 and the second rotor arm 34 are arranged in this manner, the rotational balance can be maintained further desirably even if the fishing line guide part 31 is tilted away from the rotational axis X (outward with respect to the first line L1 in FIG. 6).

Referring now to FIGS. 3 and 6, the line-entanglement prevention member 35 includes a cylindrical entanglement-preventing portion 35a formed to be flush with the cylindrical portion of the support portion 32, and a pair of tongue-shaped attachment portions 35b provided on the rear end of the entanglement-preventing portion 35a and opposed to the center. The tip of the entanglement-preventing portion 35a has a larger diameter than the other portions thereof, thereby preventing the fishing line entered inside of the spool 4 from entering the rotor 3. In addition, a weight accommodating portion 35c for accommodating a weight 39 that corrects rotational balance is formed on the inner peripheral surface of the tip of the entanglement-preventing portion 35a. The weight 39 is made of, for example, a tungsten alloy. Note that the weight accommodating portion 35c is depicted in FIG. 3 as if it were formed at a location near the second rotor arm 34 for the sake of clarity in illustration, but it is actually disposed, as shown in FIG. 6, at the mid position between the first rotor arm 33 and the second rotor arm 34 in the direction in which the fishing line guide portion 31 pivots. By disposing the weight accommodating portion 35c in this way, the rotational balance can be corrected by the weight 39 disposed on the opposite side of the fishing line guide portion 31 with respect to the rotational axis X, even if the fishing line guide portion 31 is tilted further away from the rotational axis X than the first line L1.

The line-entanglement prevention member 35 is fastened to the front wall 32a by two screw members 29 screwed from the front of the attachment portions 35b. The front face of the front wall 32a is formed to be a flat surface in a ring-like shape when the line-entanglement prevention member 35 is fitted, and even with the attachment portions 35b. In order to form such a flat surface with the attachment portions 35b on the front face of the front wall 32a, recessed portions 32c in which the tongue-shaped attachment portions 35b are fitted are formed in the front wall 32a. Accordingly, the structure is configured so that even when foreign matter enters from the spool 4 side and attaches thereto, the foreign matter can be easily removed by detaching the spool 4 and, for example, wiping it off.

Figure 7:
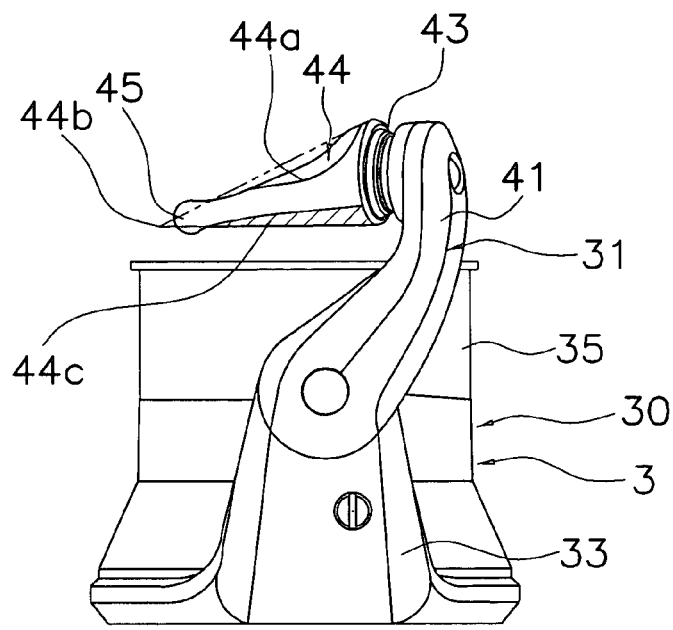
FIG. 7 is a right side view of the rotor.
Figure 8:
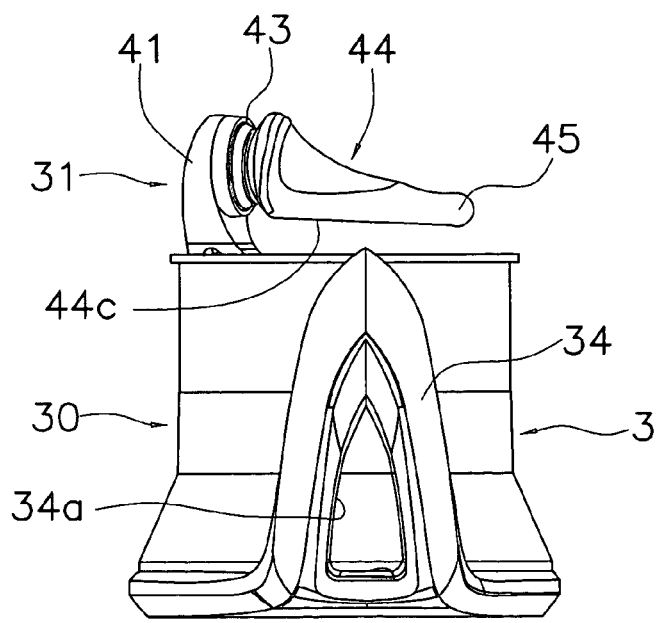
FIG. 8 is a left side view of the rotor.

The fishing line guide portion 31 includes, as shown in FIGS. 6 to 8, a support member 41, a stationary shaft 42, a line roller 43, a stationary shaft cover 44, and a fishing line-catching portion 45. The support member 41 is fitted to the tip of the first rotor arm 33. The stationary shaft 42 has a base end fixed to the tip of the support member 41. The line roller 43 is rotatively mounted to the stationary shaft 42 and is capable of guiding fishing line. The stationary shaft cover 44 is provided on the tip of the stationary shaft 42. The fishing line-catching portion 45 is provided on the tip of the stationary shaft cover 44 and catches the fishing line.

The support member 41 is fitted on the tip so that it can pivot between a line-winding posture and a line-releasing posture. The stationary shaft 42 is so configured that its base end is locked non-rotatably to the tip of the support member 41, and is fixed to the support member 41 by a mounting bolt 42a. The line roller 43 is rotatively mounted on the outer periphery of the stationary shaft 42 via a pair of bearings 46. A ring-shaped guide groove 47 for guiding fishing line is formed on the outer peripheral surface of the line roller 43, and thus, line kinks do not easily occur. Both ends of the outer periphery of the line roller 43 are covered by the support member 41 and the stationary shaft cover 44.

The stationary shaft cover 44 is arranged on the tip of the stationary shaft 42, and is an approximately cone-shaped member in which the vertex 44b is tilted rearward and toward the spool 4. The region indicated by hatching in FIG. 7 that is near the ridge line of the stationary shaft cover 44 on the rear surface thereof forms the fishing line guide surface 44c that guides fishing line to the line roller 43. A thumb recess portion 44a that is recessed from the rest of the part is formed on the front face of the stationary shaft cover 44. This type of thumb recess portion 44a is useful in returning the fishing line guide portion 31 from the line-winding posture to the line-releasing posture. The fishing line-catching portion 45 is formed so that it is smoothly continuous with the vertex 44b and bulges from the vertex 44b, and so that the tip thereof is thicker than the rest of the fishing line-catching portion 45.

With the fishing line guide portion 31 thus configured, the fishing line does not easily come off once it is caught by the fishing line-catching portion 45 because the tip of the fishing line-catching portion 45 is thicker than the other portions thereof. In addition, since the fishing line-catching portion 45 and the vertex 44b of the stationary shaft cover 44 is tilted rearward, the fishing line caught by the fishing line-catching portion 45 can be reliably guided to the guide groove 47 of the line roller 43 by the line-guiding surface.

As shown in FIG. 3, the anti-reverse mechanism 50 can prohibit/permit the rotation of the rotor 3 in the line reel-out direction. The anti-reverse mechanism 50 includes a roller-type one-way clutch 51 fitted to the mechanism support portion 10b of the housing unit 10. The one-way clutch 51 can be switched between a reverse-rotation prohibited state and a reverse-rotation permitted state. The anti-reverse mechanism 50 further includes a switching operation unit 52 for switching the one-way clutch 51 between the reverse-rotation prohibited state and the reverse-rotation permitted state. The switching operation unit 52 is supported pivotably by the operation support portion 10c and the intermediate support portion 10d of the housing unit 10.

Figure 9:
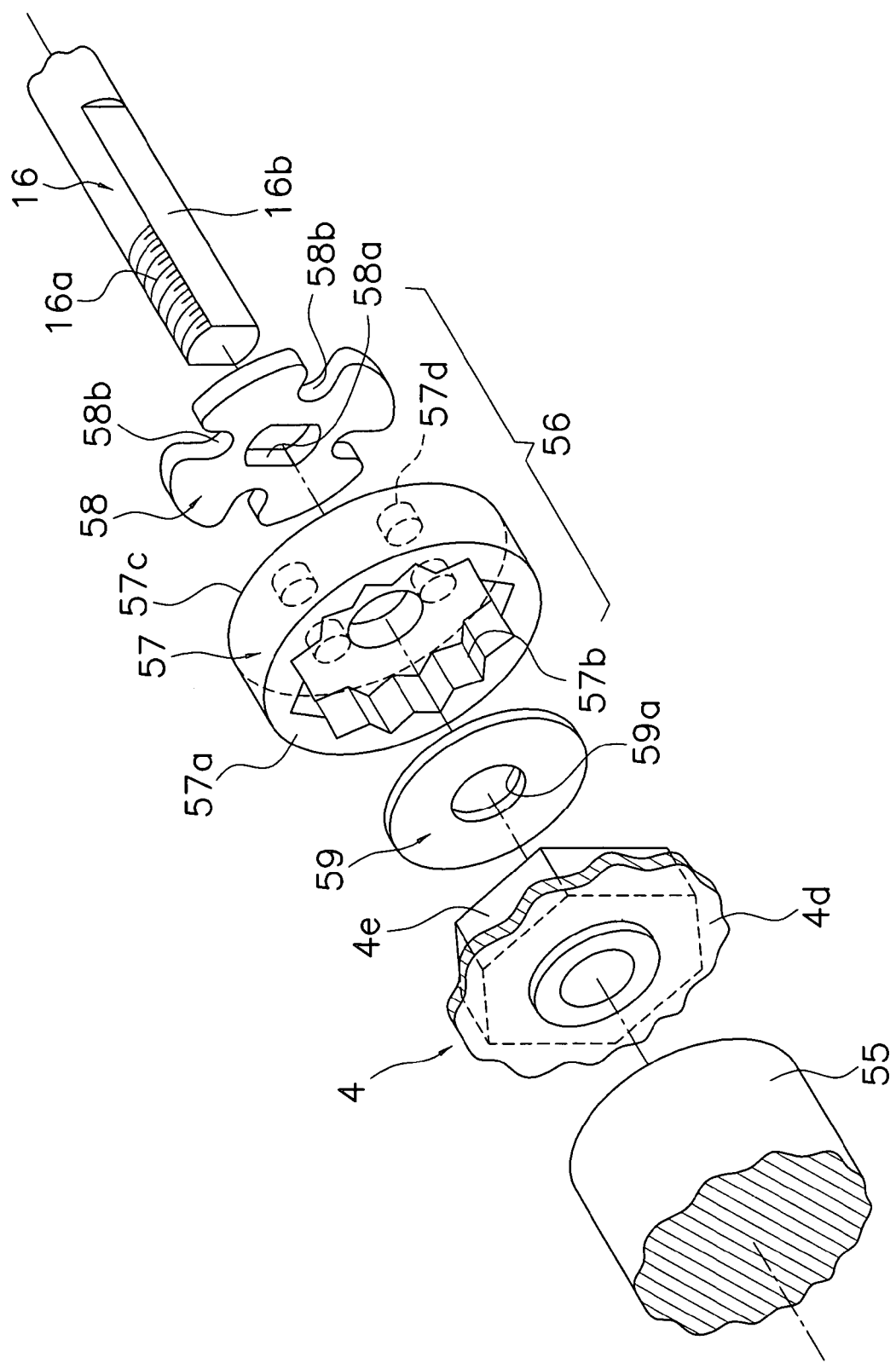
FIG. 9 is an exploded perspective view showing a mounting structure of a spool of the spinning reel.

As shown in FIG. 9, a male threaded portion 16a and chamfered portions 16b that are cut out parallel to each other are formed on the fore-end of the spool shaft 16, and the spool 4 is fitted non-rotatably and detachably to the spool shaft 16 by a removable nut 55 that is screwed on the male threaded portion 16a.

As shown in FIG. 3, the spool 4 has a shallow-channel contour. The spool 4 includes a bobbin trunk 4a, a cylindrical skirt portion 4b, and a front flange portion 4c. Fishing line is wound around the outer periphery of the bobbin trunk 4a. The cylindrical skirt portion 4b is formed on the rear end of the bobbin trunk 4a to have a larger diameter than the bobbin trunk 4a. The front flange portion 4c is formed on the front end of the bobbin trunk 4a to have a slightly larger diameter than the bobbin trunk 4a.

The bobbin trunk 4a is non-rotatable relative to the spool shaft 16, and is arranged on the outer peripheral side of the support portion 32 and the line-entanglement prevention member 35 of the rotor 3. The bobbin trunk 4a includes a front wall portion 4d formed integrally with the tip side of the inner periphery of the bobbin trunk 4a, and a boss portion 4e formed integrally with the inner peripheral side of the front wall portion 4d so as to protrude rearward. The front wall portion 4d has a number of perforations 4g formed therein that serve to reduce weight.

As shown in FIG. 9, the boss portion 4e has a regular hexagonal outer shape. The boss portion 4e is fitted rotatably to the spool shaft 16, but is made non-rotatable relative to the spool shaft 16 with a mounting member 56. The mounting member 56 includes a boss-engagement member 57 to engage non-rotatably with the boss portion 4e, and an engagement member 58 to make the boss-engaging member 57 non-rotatable relative to the spool shaft 16. The boss-engagement member 57 includes an interlock recess portion 57b and four circular interlock projections 57d. The interlock recess portion 57b has a twelve-point star-like cross section and is formed in a front face 57a of the boss-engagement member 57 opposing the boss portion 4e. The four circular interlock projections 57d engage the engagement member 58, and are provided on a rear face 57c of the boss-engagement member 57. The engagement member 58 is a disk-like member having at its center a slit 58a configured to engage non-rotatably the chamfered portions 16b of the spool shaft 16. Also provided on its outer peripheral surface are four interlock grooves 58b for interlocking with the interlock projections 57d. By fitting the slit 58a with the chamfered portions 16b, the engagement member 58 is fitted non-rotatably to the spool shaft 16. By interlocking the interlock projections 57d with the interlock grooves 58b, the boss-engagement member 57 is made non-rotatable relative to the spool shaft 16. It should be noted that a washer member 59 made of an elastic material is preferably fitted in the interlock recess portion 57b of the boss-engagement member 57. The washer member 59 has a hole 59a having an unstretched or relaxed inner diameter slightly smaller than the outer diameter of the spool shaft 16. By fitting the hole 59a onto the spool shaft 16, back-and-forth movement of the boss-engagement member 57 and the engagement member 58 is restricted relative to the spool shaft 16.

By engaging the interlock recess portion 57b having a star-like cross section with the boss portion 4e having a hexagonal cross section, the spool 4 can be fitted onto the spool shaft 16 non-rotatably with a 30-degree rotational phase. Consequently, the spool 4 can be rotated by merely loosening the removable nut 55, and the hanging length of the tackle can be adjusted without rotating the rotor 3.

As shown in FIG. 1, the skirt portion 4b has a number of perforations 4f having varied inner diameters formed therein that serve to reduce weight. The front flange portion 4c has a tapered outer peripheral surface that slightly increases in diameter from the outer peripheral surface of the bobbin trunk 4a toward the front. This greatly reduces the release resistance that acts on fishing line when casting.

Next, handling and operation of the spinning reel will be described.

It should be noted that this description of the handling describes a situation in which casting is performed with the right hand. Referring initially to FIGS. 1 and 3, when casting, the fishing line guide portion 31 is put in the line-winding posture to hook the fishing line on the fishing line guide portion 31, and the hanging length of the tackle is then adjusted.

First, the handle assembly 1 is rotated in the line reel-in direction so that the fishing line guide portion 31 is in a predetermined rotational phase in which the spool 4 is disposed near the tip of its stroke. Specifically, when casting with the right hand, for example, the fishing line guide portion 31 is easily operated with the left hand when the fishing line guide portion 31 is on the left of the spool 4, viewed from the rod side, taking into consideration the operability of the fishing line guide portion 31 and the ease of picking up the fishing line.

Referring to FIG. 3, to change the hanging length of the tackle, the removable nut 55 is loosened and the spool 4 is moved forward to release the engagement between the boss portion 4e and the boss-engagement portion 57. The spool 4 is rotated in this state so that the hanging length of the tackle is adjusted to be at an appropriate position. After adjusting the hanging length of the tackle, the spool 4 is moved rearward to engage the boss portion 4e with the boss-engaging portion 57. At this time, the hanging length of the tackle can be finely adjusted since the boss portion 4e can engage with the boss-engagement portion 57 every 30 degrees. Then, the removable nut 55 is tightened, and the adjustment of the hanging length is thus completed.

Referring now to FIGS. 7 and 8, in this state, with the fingertip of the left hand (the hand not holding the fishing rod), the stationary shaft cover 44 of the fishing line guide portion 31 is grasped to flip the fishing line guide portion 31 over to the line-releasing posture. When this is done, the stationary shaft cover 44 can be easily grasped and the fishing line guide portion 31 can be grasped and easily pivoted because the thumb recess portion 44a is formed on the stationary shaft cover 44. Then, fishing line wound on the spool 4 is grasped with the left hand, and the fishing rod is cast with the index finger of the right hand hooking the line.

After casting, the fishing line guide portion 31 is pivoted back from the line-releasing posture to the line-winding posture with the left hand, and the fishing line is grasped with the left hand to place it in the fishing line-catching portion 45 of the fishing line guide portion 31. The fishing line caught with the fishing line-catching portion 45 is guided through the fishing line guide surface 44c of the stationary shaft cover 44 to the guide groove 47 of the line roller 43. The handle assembly 1 is slightly rotated in the line reel-in direction in this state to apply slight tension to the fishing line, and the rod is set aside.

Referring again to FIG. 3, when a fish is caught on the tackle and the handle assembly 1 is rotated, the rotor 3 rotates in the line reel-in direction and the spool 4 is moved back and forth. At that time, rotation of the handle assembly 1 is transmitted to the master gear 7 through the master gear shaft 8, rotating the rotor 3 through the pinion gear 9. In addition, the oscillating mechanism 6 is operated with the pinion gear 9 via the gear-down train 20, moving the spool 4 back and forth.

As seen in FIG. 10, with this handle attachment structure for a spinning reel, the cap member 90f is mounted by screwing the male threaded portion 90e of the cap member 90f into the female threaded portion 90d of the nut member 90a. Here, by screwing and mounting the cap member 90f into the female threaded portion 90d of the nut member 90a, it will no longer be necessary to form a mounting portion on the base end of the handle arm 1b like conventional structures, and the design of the handle attachment structure can be improved with an inexpensive structure.

ALTERNATE EMBODIMENTS

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

(a) Although the housing unit 10 is made of a magnesium alloy in the foregoing embodiment, the material of the housing unit 10 is not limited to a magnesium alloy. It may be a metal that is lightweight and has high specific strength, such as an aluminum alloy and a titanium alloy, or a synthetic resin that is lightweight and has a high specific strength, such as a glass fiber-reinforced nylon and a carbon fiber-reinforced resin.

(b) Although the material of the first lid 11 is an aluminum alloy in the foregoing embodiment, the first lid 11 may be made of any metal that is lightweight and has a high specific strength, such as a titanium alloy.

(c) Although the rod-attachment portion 13 is formed integrally with the housing unit 10 in the foregoing embodiment, the rod-attachment portion may be formed integrally with the first lid 11.

(d) Although a spinning reel was used as an example when describing the handle attachment structure for a fishing reel in the foregoing embodiment, the present invention can also be applied to a handle attachment structure for a dual bearing reel.

Figure 12:
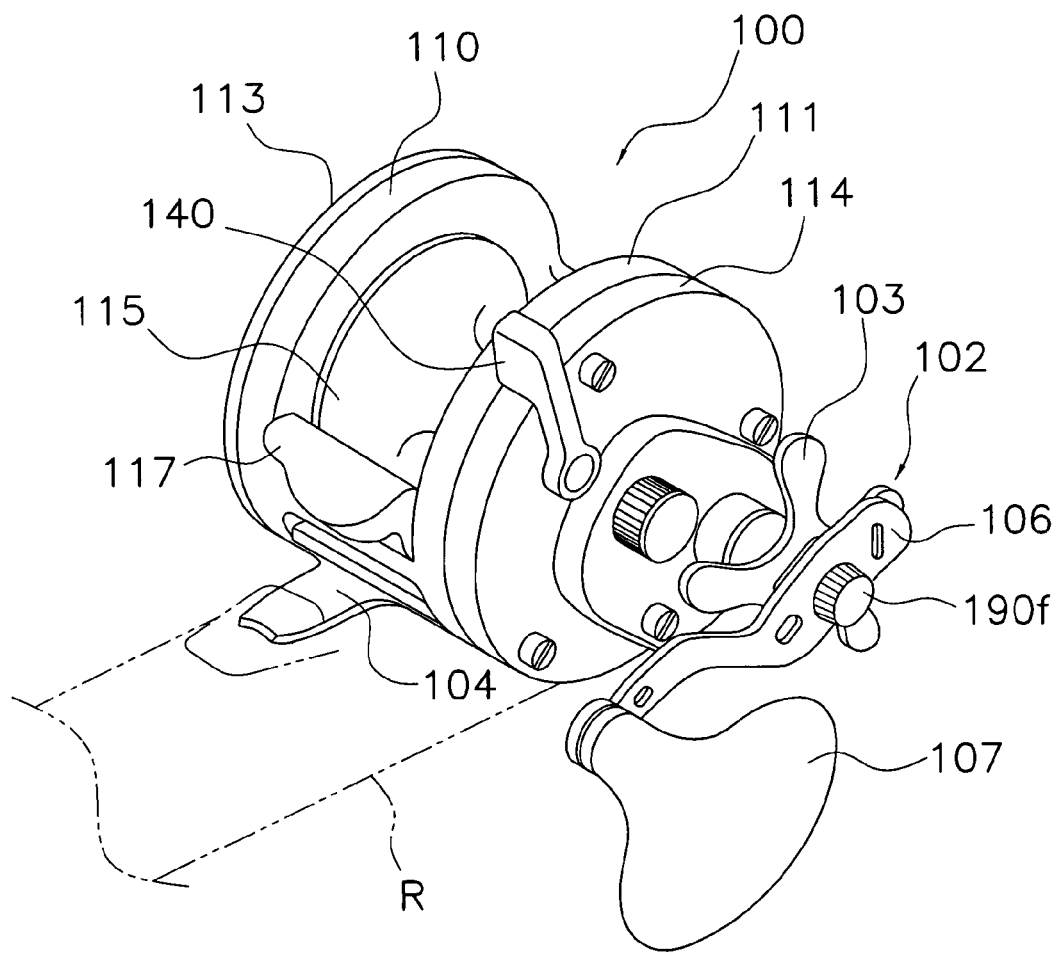
FIG. 12 is perspective view of a dual-bearing reel in accordance with a second preferred embodiment of the present invention.
Figure 13:
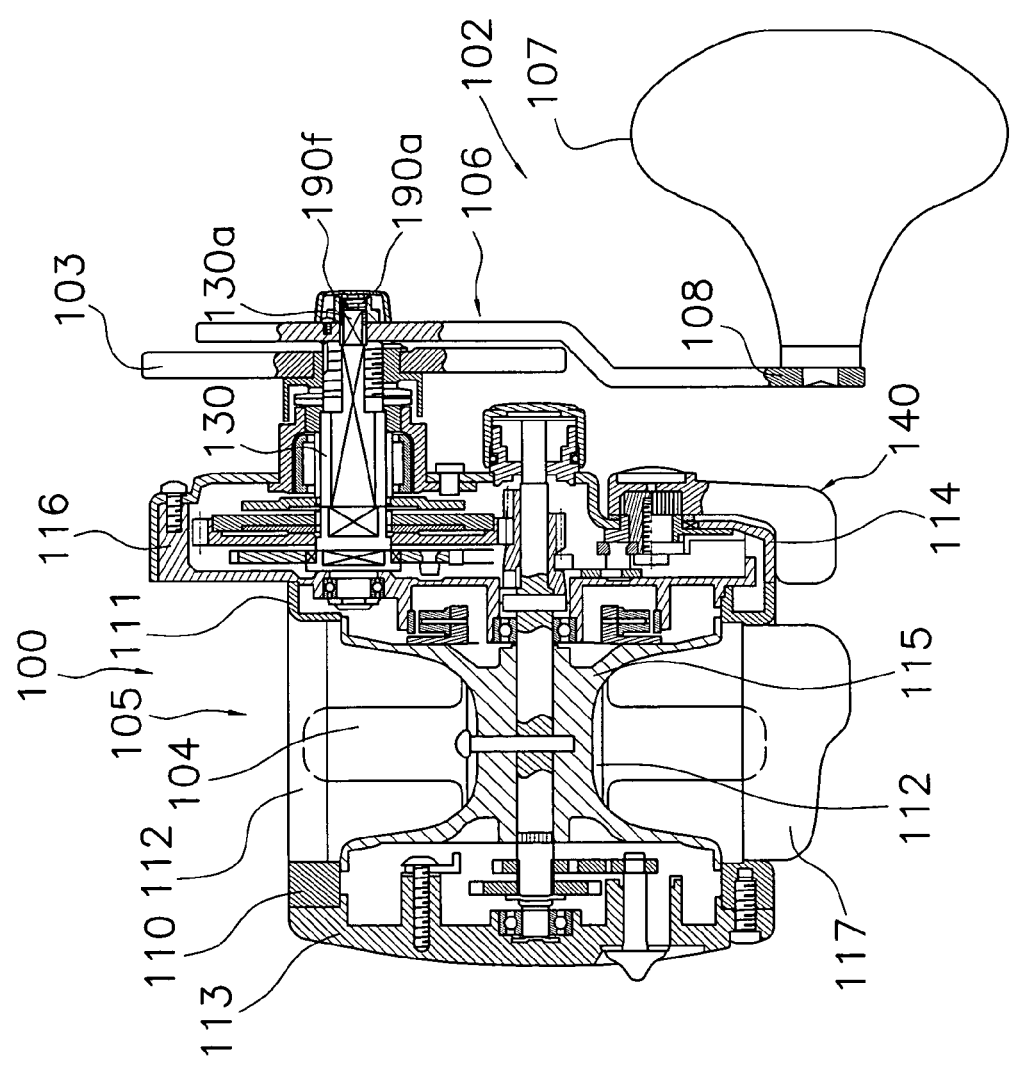
FIG. 13 is a cross-sectional view of the dual-bearing reel of the second preferred embodiment.
Figure 14:
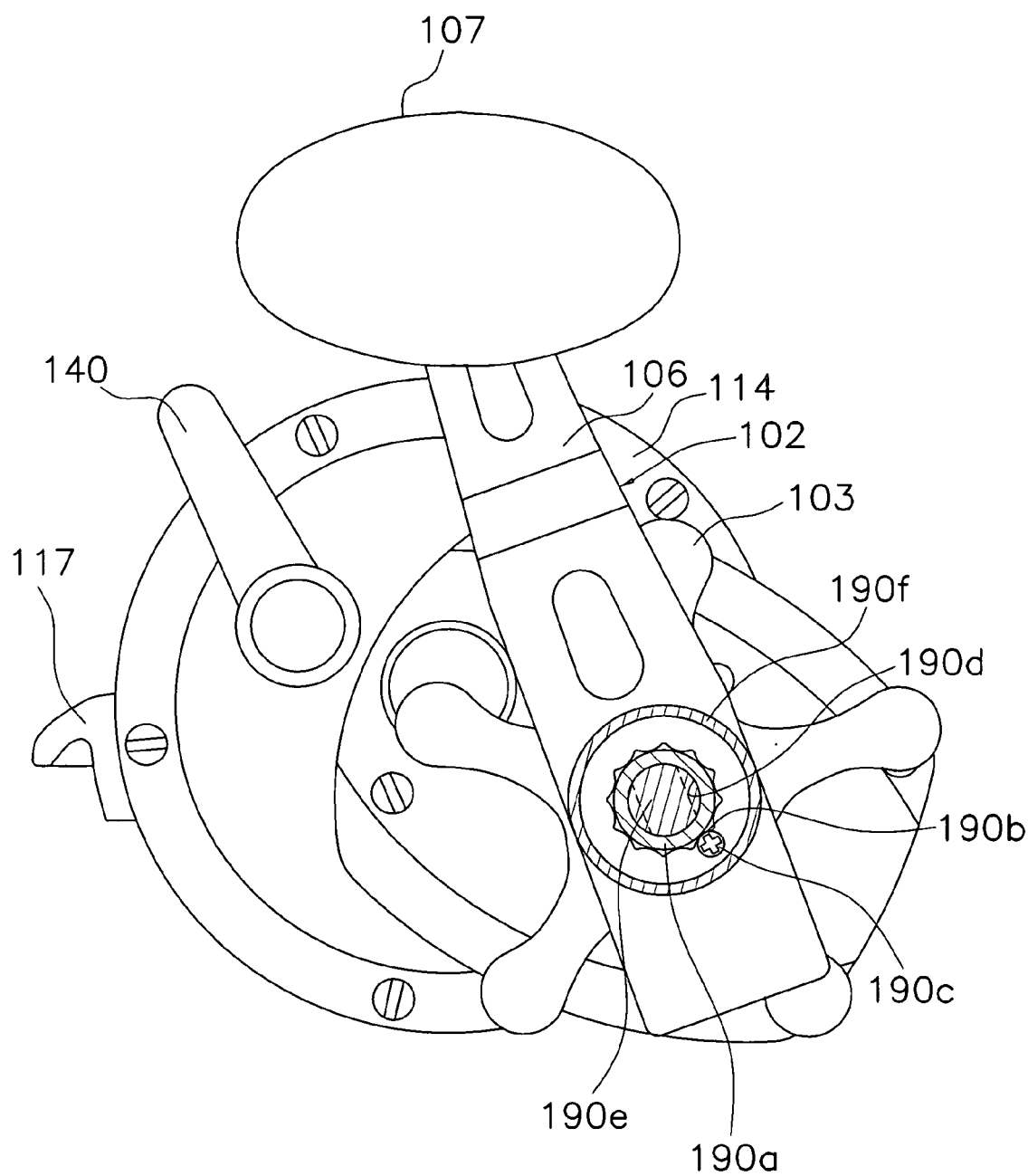
FIG. 14 is a lateral view of the dual-bearing reel of the second preferred embodiment.

A dual bearing reel in accordance with an alternate embodiment of the present invention is shown in FIGS. 12 to 14. A single handle type round reel includes a reel unit 100, a handle assembly 102, and a star drag 103. The handle assembly 102 is disposed on one side of the reel unit 100 and rotates a spool 115. The star drag 103 is disposed on the reel unit 100 on the same side as the handle assembly 102.

As shown in FIG. 12, the reel unit 100 has the spool 115 that is provided to wind or unwind fishing line and is rotatively mounted thereto. Further, the reel unit 100 is attached to a fishing rod R with a rod-mounting leg 104. The reel unit 100 includes, as shown in FIG. 13, a frame 105, a first side cover 113, a second side cover 114, and a mechanism mounting plate 116. The frame 105 has a first side plate 110 and a second side plate 111. The first and second side plates 110 and 111 are disposed on the left and right of the frame 105 to have a predetermined gap therebetween. A plurality of coupling members 112 couple the first side plate 110 and the second side plate 111. The first side cover 113 and a second side cover 114 are mounted on both sides of the frame 105 over the first and second side plates 110 and 111, respectively. The mechanism mounting plate 116 is mounted to the second side cover 114. The mechanism mounting plate 116 is disposed contacting the second side plate 111, and a space is formed between the mechanism mounting plate 116 and the second side cover 114 to accommodate various mechanisms. In addition, at the rear of the second side cover 114 of the reel unit 100, a clutch lever 140 is pivotably mounted for operating a clutch mechanism (not shown in the figures).

The frame 105 is preferably obtained by die-casting. Further, the second side cover 114 is preferably obtained by press-forming sheet metal. The first side plate 110, the second side plate 111, and the first side cover 113 form a circular shape when viewed laterally, and the outer peripheral faces are machined using, for example, a lathe or the like. Referring to FIGS. 13 and 14, the second side cover 114 and the mechanism mounting plate 116 have a shape in which a part of the circular shape projects radially outward when viewed laterally. A mounting portion of a handle shaft 130 (see FIG. 13) also projects outward in the axial direction from the center of the second side cover 114.

The coupling members 112 are plate-shaped members that are formed along the outer circumferences of the first side plate 110 and the second side plate 111 and are formed integrally with the first side plate 110 and the second side plate 111. The coupling members couple the first side plate 110 and the second side plate 111 at, for example, three locations in the reel unit 1, namely, at the rear, the bottom, and the top. Like with the first side cover 113, the outer circumferences of the coupling members 112 are machined integrally with the first side plate 110 and the second side plate 111. The rod-mounting leg 104 is fixed to the bottom coupling member 112, and a thumb rest 117 made of a synthetic resin is mounted to the rear coupling members 112.

As shown in FIGS. 12 to 14, the handle assembly 102 includes a handle arm 106, a handle knob 107, and a knob shaft 108. The handle arm 106 is non-rotatably mounted to the tip of the handle shaft 130. The handle knob 107 is rotatively mounted to one end of the handle arm 106. The knob shaft 108 is preferably made of metal and rotatively mounts the handle knob 107 to the handle arm 106.

The handle arm 106 is preferably made of a metal having a flat plate shape extending along the radial direction of the handle shaft 130. As shown in FIG. 13, the handle arm 106 is non-rotatably engaged with a chamfered portion 130*a* formed at the tip of the handle shaft 130, and is detachably fixed to the handle shaft 130 with a nut member 190*a*. As shown in FIGS. 13 and 14, the handle arm 106 is detachably mounted on the handle shaft 130 by a nut member 190*a*. As shown in FIG. 14, a plurality of engagement recess portions 190*b* are formed in the outer periphery of the nut member 190*a*, and the nut member 190*a* is prevented from rotating by inserting a rotation prevention member 190*c* into one of these engagement recess portions 190*b* and screwing it into the handle arm 130. The rotation prevention member 190*c* is preferably a screw.

As shown in FIGS. 12 to 14, a cap member 190*f* that covers the entire nut member 190*a* is mounted to the outer periphery of the nut member 190*a*. As shown in FIGS. 13 and 14, a male threaded portion 190*e* is formed on the tip of the cap member 190*f*. Further, the cap member 190*f* is fixed to the nut member 190*a* by screwing the male threaded portion 190*e* to a female threaded portion 190*d* formed on a head portion of the nut member 190*a*.

Here, as with the foregoing embodiment, since the cap member 190*f* is mounted by screwing the male threaded portion 190*e* of the cap member 190*f* into the female threaded portion 190*d* of the nut member 190*a*, the design of the handle attachment structure can be improved with an inexpensive structure.

Figure 15:
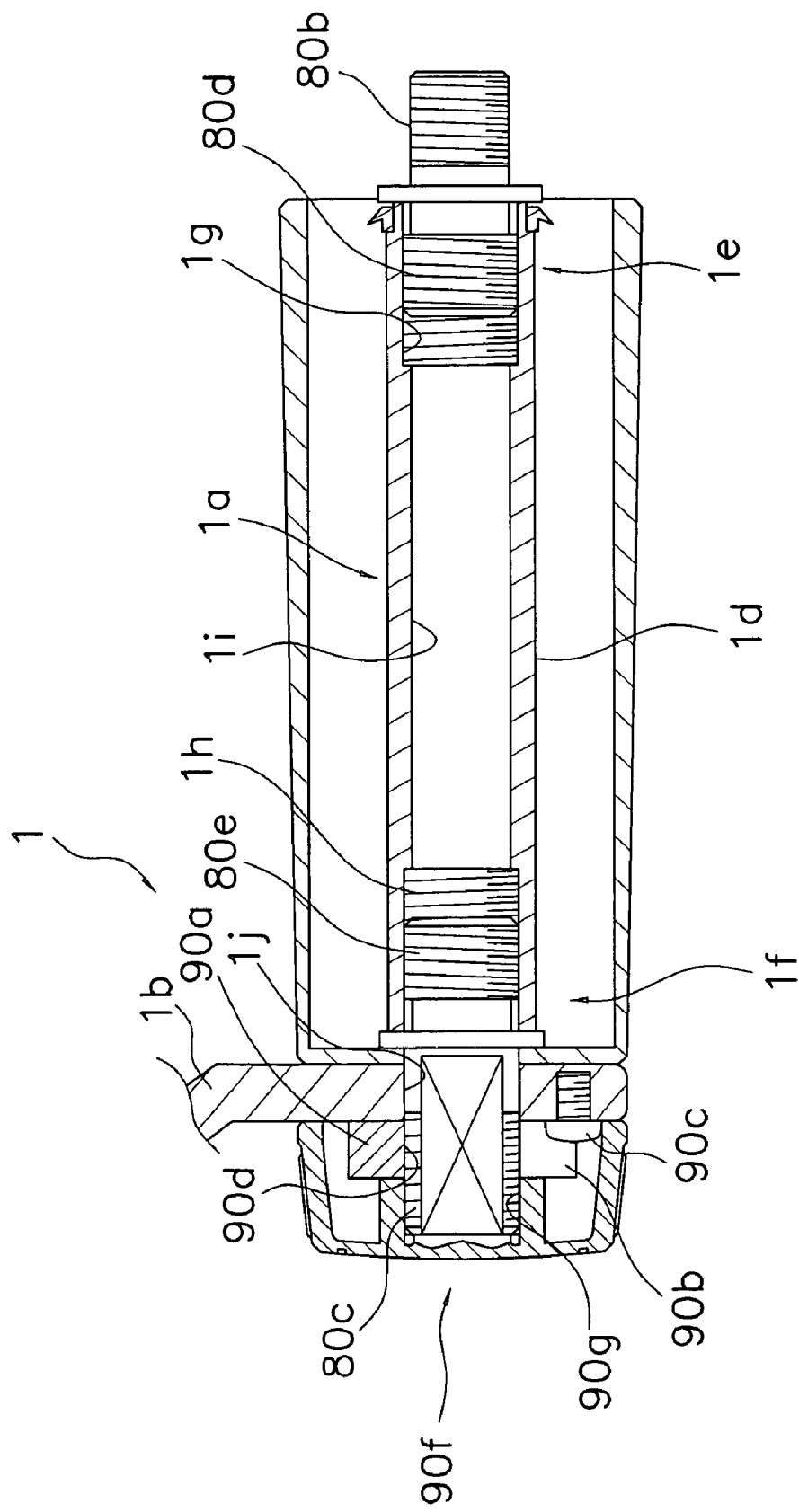
FIG. 15 is an enlarged cross-sectional view of a handle assembly of a spinning reel corresponding to FIG. 10 in accordance with a third preferred embodiment.

(e) Although the cap member 90*f* of the first embodiment is mounted by screwing the male threaded portion 90*e* of the cap member 90*f* into the female threaded portion 90*d* of the nut member 90*a*, as shown in FIG. 15, a female threaded portion 90*g* (second female threaded portion) may be provided in the cap member 90*f* and the male threaded portion 80*c* of the handle shaft 1*a* may be screwed therein.

EFFECTS OF THE INVENTION

According to the present invention, since a cap member of a handle attachment structure for a fishing reel is mounted by screwing a second male threaded portion into a first female threaded portion formed in a nut member, the design of the handle attachment structure can be improved with an inexpensive structure.

As used herein, the following directional terms "forward, rearward, above, downward, vertical, horizontal, below, and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. JP2003-028472. The entire disclosure of Japanese Patent Application No. JP2003-028472 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A handle attachment structure for a fishing reel comprising:
    a handle arm having a through hole being formed in a base end of said handle arm;
    at least one handle shaft, said handle arm being detachably mounted thereto, said handle shaft having a first male threaded portion being formed on a tip of said handle shaft and being non-rotatably mounted in said through hole;
    a nut member having a first female threaded portion being formed in an inner periphery thereof, said nut member being configured to engage said first male threaded portion to fix said handle arm to said handle shaft; and
    a cap member having a second male threaded portion being configured to engage said first female threaded portion, said cap member being disposed to cover a circumference of said nut member.

2. The handle attachment structure for a fishing reel according to claim 1, further comprising,
    a plurality of engagement recess portions formed in an outer peripheral portion of said nut member, and
    a rotation prevention member being configured to engage one of said plurality of engagement recess portions to prevent rotation of said nut member.

3. The handle attachment structure for a fishing reel according to claim 2, wherein said rotation prevention member is a screw.

4. The handle attachment structure for a fishing reel according to claim 3, wherein said handle shaft further includes a first shaft portion having a third male threaded portion configured to extend in a direction opposite said first male threaded portion and to attach to said fishing reel, and a second shaft portion having said first male threaded portion.

5. The handle attachment structure for a fishing reel according to claim 4, wherein said handle shaft comprises a tubular main shaft unit into which said first and second shaft portions are mounted.

6. The handle attachment structure for a fishing reel according to claim 1, wherein the fishing reel is a spinning reel.

7. The handle attachment structure for a fishing reel according to claim 1, wherein the fishing reel is a dual bearing reel.

8. A handle attachment structure for a fishing reel comprising:
    a handle arm having a through hole being formed in a base end of said handle arm;
    a handle shaft, said handle arm being detachably mounted thereto, said handle shaft having a first male threaded portion being formed on a tip of said handle shaft and being non-rotatably mounted in said through hole;
    a nut member having a first female threaded portion being formed in an inner periphery thereof, said nut member being configured to engage said first male threaded portion to fix said handle arm to said handle shaft; and
    a cap member having a second female threaded portion being configured to engage said first male threaded portion, said cap member being disposed to cover a circumference of said nut member.

9. The handle attachment structure for a fishing reel according to claim 8, further comprising,
    a plurality of engagement recess portions formed in an outer peripheral portion of said nut member, and
    a rotation prevention member being configured to engage one of said plurality of engagement recess portions to prevent rotation of said nut member.

10. The handle attachment structure for a fishing reel according to claim 9, wherein said rotation prevention member is a screw.

11. The handle attachment structure for a fishing reel according to claim 10, wherein said handle shaft further includes a first shaft portion having a third male threaded portion configured to extend in a direction opposite said first male threaded portion and to attach to said fishing reel, and a second shaft portion having said first male threaded portion.

12. The handle attachment structure for a fishing reel according to claim 11, wherein said handle shaft comprises a tubular main shaft unit into which said first and second shaft portions are mounted.

13. The handle attachment structure for a fishing reel according to claim 8, wherein the fishing reel is a spinning reel.

14. The handle attachment structure for a fishing reel according to claim 8, wherein the fishing reel is a dual bearing reel.

* * * * *